United States Patent [19]
Dreizin et al.

[11] Patent Number: 5,616,258
[45] Date of Patent: Apr. 1, 1997

[54] PROCESS AND APPARATUS FOR MICRO-ARC WELDING

[75] Inventors: Edward L. Dreizin, Yardley, Pa.; William Felder, Lawrenceville, N.J.

[73] Assignee: Aerochem Research Laboratories Inc., Princeton, N.J.

[21] Appl. No.: 515,946

[22] Filed: Apr. 16, 1995

[51] Int. Cl.$^6$ ............................................. B23K 9/00
[52] U.S. Cl. .................................... 219/56.22; 219/137 R
[58] Field of Search ................... 219/137 R, 56.21, 219/56.22, 76.15, 76.14, 85.14, 85.15

[56] References Cited

U.S. PATENT DOCUMENTS

| | | | |
|---|---|---|---|
| 2,998,922 | 9/1961 | Gibson | 219/76.15 |
| 3,064,114 | 11/1962 | Cresswell et al. | 219/76.14 |
| 4,523,071 | 6/1985 | Bancroft et al. | 219/56.21 |
| 4,547,391 | 10/1985 | Jenkins | 219/76.15 |
| 5,245,153 | 9/1993 | Singer et al. | 219/76.15 |
| 5,281,789 | 1/1994 | Merz et al. | 219/76.15 |

*Primary Examiner*—Clifford C. Shaw
*Attorney, Agent, or Firm*—Louis E. Marn

[57] ABSTRACT

There is disclosed a process and apparatus for generating uniform filler metal droplets of a size of from 50 to 1000 μm for deposition onto small metal parts and components thereby producing localized heating and melting of the components to be joined.

10 Claims, 2 Drawing Sheets

PROCESS AND APPARATUS FOR MICRO-ARC WELDING

FEDERALLY-SPONSORED RESEARCH AND DEVELOPMENT

The U.S. Government has a paid-up license in this invention and the right in limited circumstances to require the patent owner to license others on reasonable terms as provided for by the terms of Contract no. DAAA21-94-C-CO33 awarded by the Department of the Army.

BACKGROUND OF THE INVENTION

1. Field of the Invention

This invention relates to a process and apparatus for welding small metal parts and components, and more particularly to a process and apparatus for micro arc welding of wires and foils as well as an alternate to soldering and spot welding.

2. Description of the Prior Art

The soldering and welding of wires, wires to plates or foils, and wires to semiconductor packages are ubiquitous processes in the manufacture and modification of electrical and electronic devices. "Spot welding" is extensively used to attach lamp and vacuum tube filaments to base wires and foils; soldering is almost universally used to make chip-to-package and substrate interconnections in electronic devices.

Four different technologies are currently available for electrical interconnection of chips to the substrates or packages. They are: wire bonding, flip-chip bonding, tape-automated bonding, and beam-lead bonding. All such processes routinely use environmentally harmful solders and chlorofluorocarbon (CFC) cleaning solvents. CFC's are ozone depletants and will be discontinued after 1995. Different alternative approaches are based on solvent substitute for CFC to laser and ultrasonic cleaning methods, and development of soldering processes which do not require cleaning. Other, general for soldering technologies and discussed in literature problems are connected with failures associated with mechanically and thermally induced stresses, surface contamination, the complex metallurgy of multiple layers, and thermal expansion mismatch between the chip and the solder and the solder and the substrate. In contact welding ("spot" welding) applications, reliability is the major problem, especially when refractory metals are welded together, as in lamp and vacuum tube applications.

OBJECTS OF THE PRESENT INVENTION

An object of the present invention is to provide an improved process and apparatus for welding small metal parts and components.

Another object of the present invention is to provide an improved process and apparatus for welding metals for electronic and electrical connections reducing cleansing solvent requirements.

Still another object of the present invention is to provide an improved process and apparatus for welding small metal parts and components eliminating fluxes.

A still further object of the present invention is to provide an improved process and apparatus for welding small metal parts and components eliminating CFC cleaning solvents.

SUMMARY OF THE INVENTION

These and other objects of the present invention are achieved by generating uniform filler metal droplets of a size of from 50 to 1000 µm for deposition onto small metal parts and components thereby producing localized heating and melting of the components to be joined.

BRIEF DESCRIPTION OF THE DRAWINGS

A better understanding of the present invention may be obtained by reference to the following detailed description when taken with the accompanying drawings, wherein.

DETAILED DESCRIPTION OF THE INVENTION

Figure 1:
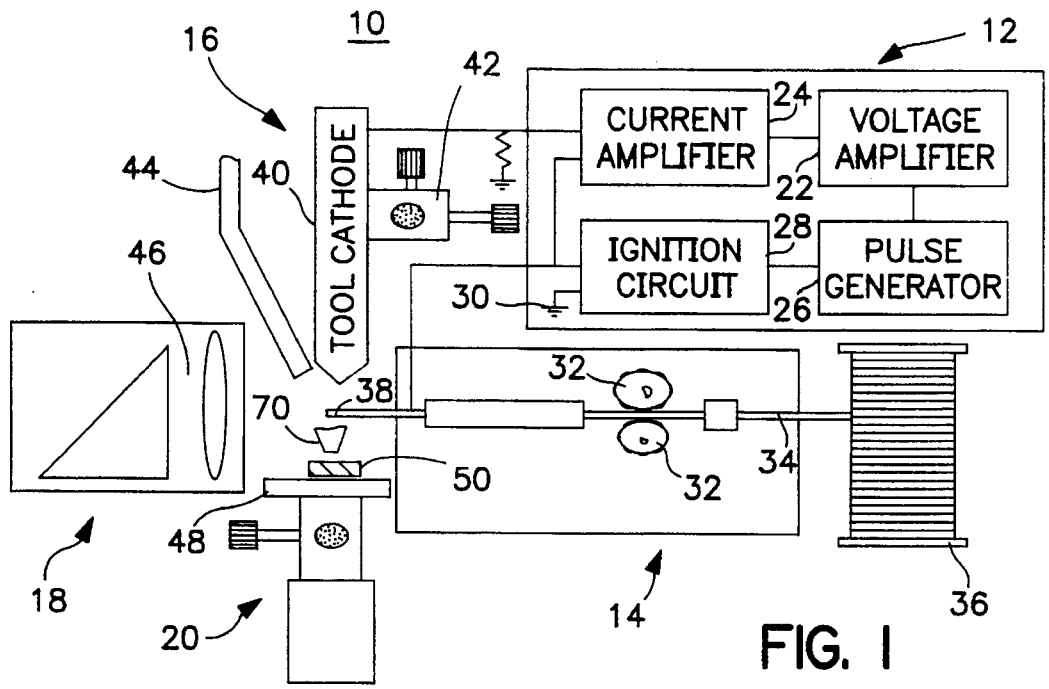
FIG. 1 is a schematic drawing of the apparatus of the present invention.

Referring now to the drawings, and particularly FIG. 1, there is illustrated the droplet welding apparatus of the present invention, generally indicated as 10 comprised of a micro-arc generator assembly, a wire feed unit, a cathode assembly, an optical arm assembly, and a micro-positioner assembly, generally indicated as 12, 14, 16, 18 and 20, respectively. The micro-arc generator assembly 12 is comprised of a voltage amplifier 22, a current amplifier 24, a pulse generator 26 and an igniting current 28 grounded at 30. The wire feed unit assembly 14 is comprised of rollers 32 for removing welding wire 34 from a spool 36 thereof and for passing a feed end 38 of the wire 34 to the welding site, as more fully hereinafter described. The welding wire 34 is formed of a metal, such as copper, tungsten, aluminum, molybdenum, titanium, iron, tantalum, zirconium, nickel and alloys thereof. The cathode electrode assembly 16 includes an electrode 40 and a positioner device 42. The cathode electrode 40 is formed of a metal, such as aluminum, copper, brass, iron, molybdenum, and tungsten.

A gas tube 44 is positioned proximate an end of the cathode 40 about the welding site, as more fully hereinafter described. The optical arm assembly 18 includes a lens system 46 for viewing the welding site. The micro-positioner 20 includes a sample holder 48 for positioning component 50 to be welded.

Figure 2:
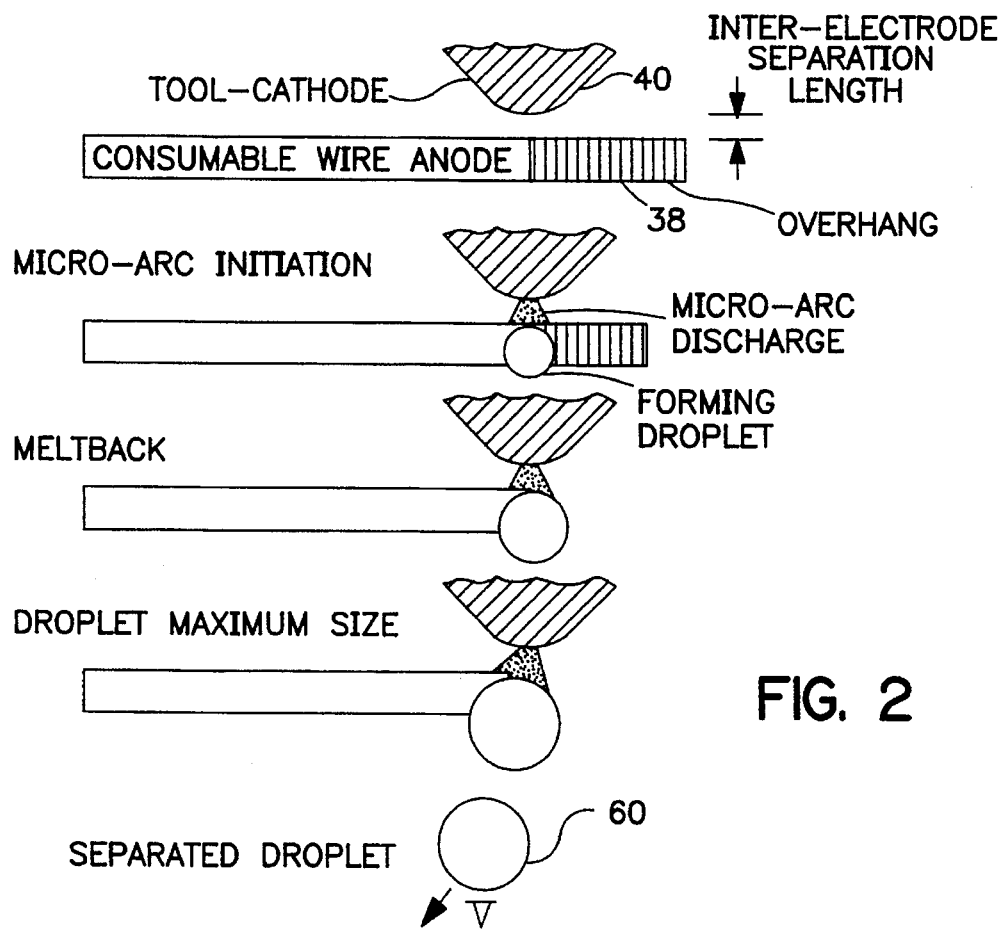
FIG. 2 schematically illustrates droplet formation of the process of the present invention.

In operation, the apparatus of the present invention produces spherical, 50–1000 µm diameter metal drops as the welding filler metal from an anode wire having a diameter of from 25 to 500 µm. Metal drops of controlled diameter and initial temperature are directed at the weld site (to the location where a filler metal drop will weld together the components to be joined). Droplets are formed by the rapid melting of a consumable (metal) wire anode in a pulsed micro-arc discharge as indicated schematically in FIG. 2. During the micro-arc pulse, a small area of the anode wire (part of the "overhang") is initially fused to begin forming a droplet.

Later in the pulse, the overhang melts back into the shape of a spherical droplet with additional anode material melting until the droplet is at maximum size. At the end of the micro-arc pulse, the molten droplet 60 breaks away from the anode, leaving at a reproducible velocity (vector v, FIG. 2) size, and temperature each time the anode wire 34 is advanced and the micro-arc pulse repeated. The droplet cools in the surrounding gas on its trajectory to the area to be welded as determined by the droplet size, time of travel, and gas temperature/composition as controlled by gaseous flow through the tube 44.

Prior to initiating a reset discharge, the wire anode 3 is advanced to provide an overhang of from about 1.0 to 5.5 wire diameters between the end of the anode wire at the point of pulsed discharge. Interelectrode separation distance is maintained at between 0.01 to 0.05 mm.

The droplet temperature immediately prior to the contact with the welded components exceeds the melting point of either of the welded components. The size, velocity, and temperature of the droplet are controlled so that the ratio of its kinetic energy to its surface energy (The Weber number) is close to 1 (lies in the range 0.5 to 10) and the diameter of the droplet is more than 3 times greater than the thickness or diameter of the smaller component of the weld. These conditions provide that the drops do not rebound or splash at the collision with the welded components, but rather stay at the place of the collision, melt both components to be welded and enclosing the smaller components to form the welded joints.

Precise droplet deposition on the weld site is provided by the repeatable trajectories of the droplets produced using the apparatus of the present invention. Additionally, to facilitate droplet positioning to the site of the weld, a cone or funnel 70 positioned beneath the electrode unit 16 with its narrow part immediately above the weld site. The cone or funnel is made of a refractory material with a low heat conductivity, i.e., a ceramic. A droplet entering the cone rebounds from its internal surface and ultimately exits the cone 70 through its narrow opening. Thus, accuracy of droplet positioning in such case is determined by the cone narrow opening size. The droplet temperature and heat content are not affected significantly by the collisions with the cone surface because of the low heat conductivity of the cone material. The wire feed unit 14 is similar to the commercially available wire feed system used in automated welding machines; however, differing in scale.

Figure 3:
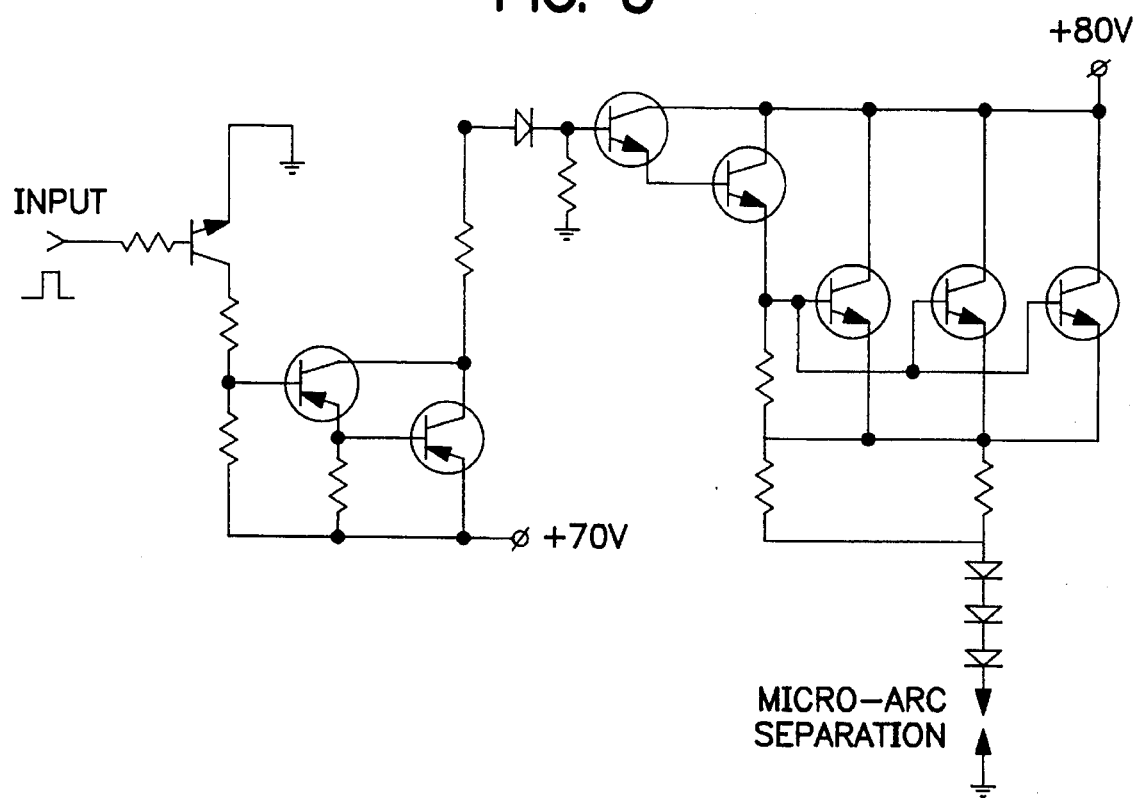
FIG. 3 is a wiring diagram of a micro-arc pulse amplifier.
Figure 4:
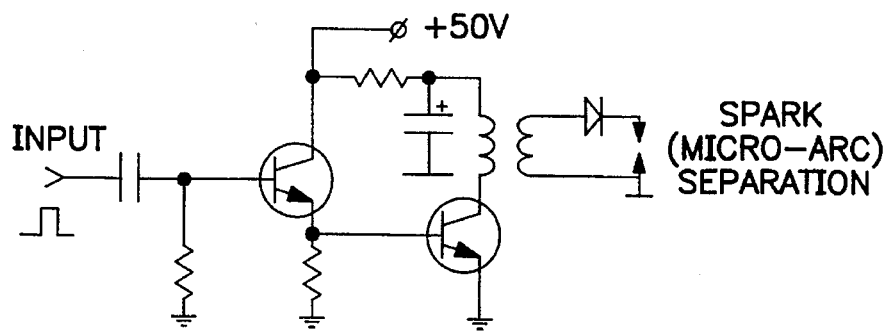
FIG. 4 is a wiring diagram of an ignition pulse former.

The micro-arc generator consists of a pulse generator, such as "Datapulse-110B®", sold by Tucker Electronics & Computers with its output connected to a custom-made pulse amplifier (FIG. 3), and ignition pulse former (FIG. 4).

The electrode unit consists of a cathode (40) and a consumable wire anode 34. The cathode 40 is mounted on a three-dimensional positioning stage. The interelectrode separation and overhang are controlled manually using a direct measuring microscope including a 28 mm eyepiece with reticle and a 20X objective.

A sample holder 48 using a spring to tighten the substrate to angle brackets, with wires inserted between the brackets and the substrate, is employed to produce wire to flat substrate welds. For wire to wire welds, a crimped connection of the wires is preliminarily made, and then the wires twisted together are placed either on the table, below the electrode unit.

Aiming optics appliance is built to observe the location of the formed weld and adjust the position of the components to be welded. It consists of a convex lens, right angle prism, and microscope eyepiece mounted using a mini positioner. The convex lens combined with the eyepiece form a magnified image of the weld site and the prism diverts the light on 90°. The optical assembly 18 is positioned so that a magnified image of the welded components is seen by the operator controlling the interelectrode separation in the electrode unit. Therefore, the location of the welded components can be adjusted as needed.

EXAMPLES

The following examples are illustrative of details of apparatus and conditions for the process of the invention and it is to be understood that the scope of the invention is not to be limited thereby.

Example 1

Copper wire of 0.004" diameter is used as a consumable wire anode in micro-arc Generator of Nondisperse Metal Droplets (GEMMED). Anode wire overhang of 0.006" is established prior to the micro-arc pulse initiation. A copper wire of 0.002" diameter is tightened to the surface of a printed circuit board using a sample holder described above. The distance from the wire anode to the weld site is 0.08". The micro-arc pulse duration is 85 µS, micro-arc current is 40 A, and interelectrode voltage is 25 V. The copper droplet of 0.0068" diameter is formed at temperature 2200K and velocity 1 m/s. The corresponding Weber number is 1.06. The velocity direction is perpendicular to the wire electrode axis. The drop impinges the weld site, encloses the wire and forms welded joint of the wire to the printed circuit board.

Example 2

Molybdenum wire of 0.01" diameter is used as a consumable wire anode in GEMMED. Anode wire overhang of 0.015" is established prior to the micro-arc pulse initiation. A tungsten wire of 0.004" diameter is coiled around the Kanthal 0.028" diameter wire. The distance from the wire anode to the weld site is 0.06". A nitrogen flow of 0.5 l/min. is directed to the weld site to prevent oxidation of the metals at high temperatures. The micro-arc pulse duration is 480 µS, micro-arc current is 85 A, and interelectrode voltage is 18 V. The molybdenum droplet of 0.0168" diameter is formed at temperature 4250K and velocity 1.5 m/s. The corresponding Weber number is 4.8. The velocity directed at an angle of 80° relative to the wire electrode axis. The drop impinges the weld site, encloses the tungsten wire and forms welded joint of the tungsten and Kanthal wires.

The droplet welding process and apparatus disclosed in the present invention will substitute soldering and spot welding in electrical and electronic device manufacturing.

The advantages of the present invention are:

1. Replacement of "soft" metal solder joints with sturdier welded joints and at the same time replacing heavy toxic metals like Pb and Cd in solders with environmentally benign metals.
2. Eliminating the need for cleaning by environmentally harmful compounds.
3. Minimizing thermal damage to electronics components by microwelding instead of soldering contacts.
4. Avoiding damage to sensitive components such as field-effect transistors due to direct electrical contact of soldering devices with components.
5. Joining "hard-to-join" materials including refractory metals or semiconductors.
6. Using inexpensive filler metals (e.g., Cu or al) to replace expensive gold or silver-coated surfaces in soldering contacts.

While the present invention has been described with the electronic/electrical connection disposed beneath the droplet formation, it will be understood that the electronic/electrical connection may be positioned at other relative locations to the wire/cathode site with droplet direction being determined by the micro-arc discharge (and its force) as a function of droplet size, i.e., smaller size permit other droplet directions.

While the invention has been described in connection with several exemplary embodiments thereof, it will be understood that many modifications will be apparent to those of ordinary skill in the art; and that this application is intended to cover an adaptations or variations thereof. Therefore, it is manifestly intended that this invention be only limited by the claims and the equivalents thereof.

What is claimed is:

1. A process for welding small metal parts and components, which comprises the steps of:

a) Positioning a wire proximate said small metal parts and components to be welded, said wire being formed of a filler material;

b) positioning a cathode proximate said wire a distance of from about 1.0 to 5.5 wire diameters from a free end thereof;

c) generating a micro-arc discharge between said cathode and said wire to heat such filler material to a temperature above its melting point no form a drop of said filler material of a diameter of from about 50 to 100 μm; and d) effecting deposition of said drop on said small metal parts and components.

2. The process as defined in claim 1 wherein said cathode is maintained at a distance of from about 0.01 to 0.05 mm from said wire.

3. The process for welding small metal parts and components as defined in claim 2 wherein steps b) and c) are repeated until welding of said small metal parts and components is completed.

4. The process for welding small metal parts and components as defined in claim 1 wherein said wire is advanced after step c) a distance of from 1.0 to 5.5 wire diameter.

5. The process for welding small metal parts and components as defined in claim 1 wherein a cone member is positioned below said wire to direct said drop towards said small metal parts and components.

6. The process for welding small metal parts and components as defined in claim 1 wherein size, velocity and temperature of said drop is controlled to provide a ratio of kinetic energy to surface energy of from about 0.5 to 10.

7. The process for welding small metal parts and components as defined in claim 6 wherein said ratio is preferably 1.0.

8. The process for welding small metal parts and components as defined in claim 1 wherein a gaseous stream is directed towards said drop during step c).

9. The process for welding small metal parts and components as defined in claim 8 wherein said gaseous stream flow is continuous during said process.

10. The process for welding small metal parts and components as defined in claim 1 wherein said small metal parts and components are positioned beneath a forming drop.

* * * * *